United States Patent
Janneteau et al.

(10) Patent No.: US 9,525,646 B2
(45) Date of Patent: Dec. 20, 2016

(54) METHOD, DEVICE AND COMPUTER PROGRAM FOR SELECTING A ROUTER NODE IN AN LLN NETWORK

(71) Applicant: COMMISSARIAT A L'ENERGIE ATOMIQUE ET AUX ENE ALT, Paris (FR)

(72) Inventors: Christophe Janneteau, Chaudon (FR); Mounir Kellil, Massy (FR); Nicolas Riou, Meylan (FR)

(73) Assignee: Commissariat à l'énergie atomique et aux énergies alternatives, Paris (FR)

(*) Notice: Subject to any disclaimer, the term of this patent is extended or adjusted under 35 U.S.C. 154(b) by 144 days.

(21) Appl. No.: 14/379,374

(22) PCT Filed: Mar. 5, 2013

(86) PCT No.: PCT/EP2013/054321
§ 371 (c)(1),
(2) Date: Aug. 18, 2014

(87) PCT Pub. No.: WO2013/131871
PCT Pub. Date: Sep. 12, 2013

(65) Prior Publication Data
US 2015/0029927 A1    Jan. 29, 2015

(30) Foreign Application Priority Data
Mar. 7, 2012   (FR) ..................... 12 52076

(51) Int. Cl.
*H04L 12/931* (2013.01)
*H04L 12/751* (2013.01)
(Continued)

(52) U.S. Cl.
CPC .............. *H04L 49/201* (2013.01); *H04L 45/02* (2013.01); *H04L 45/16* (2013.01); *H04L 45/48* (2013.01)

(58) Field of Classification Search
None
See application file for complete search history.

(56) References Cited

U.S. PATENT DOCUMENTS

| 9,019,981 B1* | 4/2015 | Weinstein | H04B 1/719 370/432 |
| 2005/0180447 A1* | 8/2005 | Lim | H04L 12/185 370/432 |

(Continued)

OTHER PUBLICATIONS

Estrin et al., "Protocol Independent Multicast—Sparse Mode (PIM—SM): Protocol Specification", Jun. 1998, IETF.*

(Continued)

*Primary Examiner* — Ayaz Sheikh
*Assistant Examiner* — Peter Chau
(74) *Attorney, Agent, or Firm* — Oblon, McClelland, Maier & Neustadt, L.L.P.

(57) ABSTRACT

A method for selecting a router node in a LLN (Low power and Lossy Network) type telecommunication network wherein, upon receipt by a router node of a data packet from a host node or an adherence request to a multicast group from a host node, the router node transmits to a root node a MER_Request request of configuration as a multicast router node to serve the host node, and upon receipt of the MER_Request request, the root node determines, from an association table, a configuration of the router node and transmits to the router node a MER_Reply reply message including the determined configuration.

19 Claims, 4 Drawing Sheets

(51) Int. Cl.
*H04L 12/761* (2013.01)
*H04L 12/753* (2013.01)

(56) References Cited

U.S. PATENT DOCUMENTS

| | | | |
|---|---|---|---|
| 2006/0268869 A1* | 11/2006 | Boers | H04L 45/00 370/390 |
| 2009/0161594 A1* | 6/2009 | Zhu | H04L 12/18 370/312 |
| 2009/0232031 A1 | 9/2009 | Vasseur et al. | |
| 2012/0140779 A1 | 6/2012 | Janneteau et al. | |
| 2012/0294308 A1* | 11/2012 | Cai | H04L 45/38 370/390 |
| 2013/0028143 A1* | 1/2013 | Vasseur | H04W 40/22 370/256 |
| 2013/0182581 A1* | 7/2013 | Yeung | H04L 12/1877 370/244 |

OTHER PUBLICATIONS

Thubert et al., "LLN Routing Fundamentals", Apr. 9, 2009, IETF.*
International Preliminary Report on Patentability issued Oct. 9, 2014 in PCT/EP2013/054321 filed on Mar. 5, 2013 (with English translation0.
U.S. Appl. No. 14/383,356, filed Sep. 5, 2014, Janneteau, et al.
International Search Report issued Jun. 27, 2013, in PCT/EP2013/054321, filed Mar. 5, 2013.
French Preliminary Search Report issued Dec. 13, 2012, in Patent Application No. FR 1252076, filed Mar. 7, 2012 (with English Translation of Category of Cited Documents).
T. Winter, et al., "RPL: IPv6 Routing Protocol for Low power and Lossy Networks; draft-ietf-roll-rpl-19", Roll, Internet Draft, Intended Status: Standards Track, No. 19, XP 015074831, Mar. 14, 2011, 84 pages.
P. van der Stok, "Multicast requirements for control over LLN; draft-vanderstok-roll-mcreq-00", Roll, Internet-Draft, Intended Status: Informational, XP 015080840, Feb. 27, 2012, 10 pages.

* cited by examiner

METHOD, DEVICE AND COMPUTER PROGRAM FOR SELECTING A ROUTER NODE IN AN LLN NETWORK

TECHNICAL FIELD

This invention is within the context of multicast in computer networks highly restricted in terms of available resources (batteries, memories, calculating capacity, available links, etc.) and more specifically relates to a method for selecting a router node in an LLN (Low power and Lossy Network)-type telecommunication network, including, for example a plurality of nodes likely to act as data packet routers from or to at least one host node belonging to a group of multicast nodes likely to transmit and/or receive data packets through said LLN network, the latter further including a root node including a first table for storing associations between at least one router node and at least one host node of a multicast group.

The invention also relates to a device and a computer program able to implement the method according to the invention.

STATE OF PRIOR ART

Duplication of data packets exchanged during multicast-type communications in LLN (Low power and Lossy Network) type networks results in generating a wastage of resources such as pass-band, calculating capacity, memory space and backup energy which are, in essence, very limited for this type of networks. This wastage can cause a significant network dysfunction, is premature aging or even its full blocking.

This problem happens when a multicast packet is a transmitted/broadcast in a broadcast-type level 2 frame (link level of the OSI model; for example MAC (Media Access Control) level)), which is often the case in computer networks, including LLN networks.

For example, within the context of a RPL (Routing Protocol for Low power and Lossy Networks) network, the duplicated packets can come from a node which broadcasts multicast data packets without respecting the transfer logic of a RPL node, that is without transferring the multicast packet in a unicast frame (level 2) to one or even several determined neighbouring node(s). This happens if, for example, the node in question is within radio range of a RPL network but is not, strictly speaking, a part of this RPL network. This situation corresponds to the case where the node has no information about the nodes of the RPL network, or does not implement the RPL functionalities. Such a node can be, for example, a batteryless node recovering the energy required for transmitting a message, for example a command through an external physical action undergone by the node such as a ZigBee GreenPower-type node (wireless batteryless switch).

In the case of a multicast source, the latter can send a multicast IP packet on a broadcast-type level 2 frame which will be received by all the RPL routers within direct radio range of this source. If it is a multi-hop-type multicast packet, a step by step transmission will be performed (at level 2, this may be made in unicast or broadcast) until the packet reaches its final destination. However, if the multicast IP packet transmitted by the source is received by several RPL routers within direct radio range of said source, each of these routers will transmit a copy of said packet in the network. This situation then causes duplications of said packet in the RPL network since the same packet is simultaneously and independently injected in the RPL routing tree by several nodes. Thus, a node on the packet path which can be either an intermediate router, either the final destination of the packets, runs the risk of receiving several copies of the same multicast packets, which can generate numerous problems such as for example an overconsumption of the passband of the network or even its premature aging.

The case of a destination node of the packets is similar enough to that of the source in terms of effects on the network, except that the purpose of the destination node is to receive multicast packets and not to transmit them. For this, the destination node transmits in a broadcast frame (level 2) its adherence request to an IP multicast group in a RPL network, for example a MLD Report-type request [R. Vida et al. "Multicast Listener Discovery Version 2 (MLDv2) for IPv6", RFC 3610, June 2004]. Even if the request of the destination node has a local scope, meaning the IP (link_local scope), it can be taken into account by several RPL routers within direct radio range of the destination node. In this case, any RPL router having received said request, will initiate the construction of a routing path consisting of a branch of a multicast tree from the RPL network to the destination node. Consequently, the destination node runs the risk of receiving a number of copies of a same multicast IP packet equal to the number of RPL routers within direct range of the destination node. Once again, this duplication of the traffic in the RPL network can generate numerous problems such as for example an overconsumption of the network pass-band or its premature aging.

The purpose of the invention is to overcome the drawbacks of the above described prior art.

DISCLOSURE OF THE INVENTION

This purpose is achieved by means of a method for selecting a router node in a LLN (Lower power and Lossy channel Network)-type telecommunication network, for example, including a plurality of router nodes likely to act as data packet routers from or to at least one host node belonging to a group of multicast nodes likely to transmit and/or receive data packets through said network, and a root node including a first table for storing associations between at least one router node and at least one host node of a multicast group.

The method according to the invention includes the following steps:
- upon receipt by a router node of a multicast data packet from a host node or a adherence request to a multicast group from a host node, said router node transmits to the root node a MER_Request request (Multicast Edge Router Request) request of configuration as a multicast router node to serve said host node, and,
- upon receipt of the MER_Request request, said root node determines from said first association table, a configuration of the router node and,
- transmits to said router node a MER_Reply reply message including the configuration determined.

The MER_Request request is for example a DAO (Destination Advertisement Object)-type message.

Preferentially, the MER_Request request includes the address of said host node, and the MER_Reply reply message includes the address of said host node, and a duration of the configuration determined for the router node relative to the host node.

Optionally, the MER_Request request includes the address of the multicast group with which said host node is associated.

According to the invention, the configuration of the router node consists in assigning it one of the following statuses:
PENDING: indicating that said router node is waiting for being configured by the root node,
MER (Multicast Edge Router): indicating that the router node is configured as a single multicast router for the host node,
NON_MER: indicating that the router node is not configured as a multicast router for the host node.

In a preferred embodiment, the method according to the invention further includes a step consisting of configuring in each router node a second association table including the following information:
the address of the source host node of the multicast data packet or of the adherence request to a multicast group received by the router node;
a status of the router node relative to said host node among one of the statuses PENDING, MER, or NON_MER;
a lifetime of the status of the router node relative to the host node.

Said second association table further includes the following information:
the type of the host node indicating whether the host node is a source of the multicast data packets received by the router node or the destination of the multicast data packets received by the router node (i.e. source of a adherence request to the multicast group);
the address of the multicast group with which the host node is associated.

It is noted that the function of the MER router node relative to a host node varies according to the information contained in the second association table of said host node. More precisely, this function varies according to four possible alternatives which depend on whether the optional fields [type of the host] and [multicast address] are used or not in the MER_Request/Reply exchanges and the state diagrams at the router nodes and the root node.

Case 1: the fields [type of the host] and [multicast address] are NOT used: in this case, a router node with MER status relative to a host node means that this router node is configured as a multicast router for this host node, for any multicast group and regardless of the role of the host node in each of these groups (source and/or destination of the data packets). Thus, for example, if the MER status has been configured following a adherence request to a multicast group #1 by the host node (case of a "destination" host node), the same router node with MER status will also (automatically) act as a multicast router for this host node if it is a source of another multicast group #2 . . . then an interaction with the root node via MER_Request/Reply messages is not necessary for this second multicast group.

Case 2: the fields [type of the host] and [multicast address] are both used: in this case, a router node with MER status relative to a host node means that this router node is configured as a multicast router for this host node for the multicast group which address is contained in the [multicast address] field and for a given role, source or destination of the data packets, of this host node relative to this multicast group. Thus, it is potentially possible in this case for a host node to be served by different MER router nodes for different multicast groups and/or roles (source/destination) of the host node.

Case 3: the [type of the host] field is not used but the [multicast address] field is used: in this case, a router node with MER status relative to a host node means that this router node is configured as a multicast router for this host node for the given multicast group which address is contained in the [multicast address] field and regardless of the role (source and/or destination of the data packets) of the host node relative to this multicast group.

Case 4: the [type of the host] field is used but the [multicast address] field is not used: in this case, a router node with MER status relative to a host node means that this router node is configured as a multicast router for this host node for any multicast group but only for a given role, source or destination of the data packets, of the host node relative to this multicast group.

In a first alternative implementation of the method according to the invention, when the host node is a source of the data packets received by a router node having a MER status relative to said host node, this router node intercepts all the multicast packets transmitted by said host node and re-routes them in the network, and when the host node is the destination of the data packets received by said router node, the latter intercepts the adherence requests to a multicast group which are transmitted by said host node and triggers the creation, for said multicast group, of a multicast routing branch in said network.

The method according to the invention further includes a step of managing said second association table wherein, upon receipt by the router node of a data packet including an address of a new source host node of data packets, said router node:
records in said second association table the address of said new source host node, a PENDING value for the status of the router node relative to this new source host node, and a non-zero value for the lifetime of the status of the router node relative to the new source host node,
generates a MER_Request message including the address of the new host node, and optionally the address of the multicast group with which this new host node is associated and the type of the host node relative to the multicast group (in this case of the "source" type), and
transmits the MER_Request message generated to the root node.

And, upon receipt by the router node of a adherence request to a multicast group from a new host node, said router node:
records in said second association table the address of the new host node, a PENDING value for the status of said router node relative to this new host node and a non-zero value for the lifetime of the status of the router node relative to the new host node,
generates a MER_Request message including the address of the new host node, and optionally the address of the multicast group to which this new host node intends to register and the type of the host node relative to the multicast group (in this case of the "destination" type), and
transmits the MER_Request message generated to the root node.

In both cases, the router node stores the received packet (data or adherence request) while waiting for a MER_Reply of the root node if its available memory allows it.

According to another characteristic of the method of the invention, in the case where the router node receives a MER_Reply reply message including a NON_MER status, said router node:

checks whether there is, in the second association table, a host node concerned by the MER_Reply reply message received;
    if yes, sets its status relative to the host node concerned to NON_MER, and
    replaces the value of the lifetime of its status relative to the host node concerned with that indicated in the MER_Reply message received.

Besides, if the host node concerned by the MER_Reply message is a source of the data packet received by the router node, the latter removes from its memory the data packets stored beforehand during the waiting phase of the MER_Reply reply, and if said host node is a destination of the data packet received by the router node, the latter removes the message received from the destination node stored beforehand (i.e. it removes the adherence request to the multicast group).

If the router node receives a MER_Reply reply message including a MER status, said router node:
    checks whether there is in the second association table, an entry with a host node concerned by the MER_Reply received,
    if yes, said router node sets its status relative to the host node concerned to MER, and
    replaces the lifetime of its status relative to the host node concerned with that indicated in the MER_Reply message received.

And, if the host node concerned by the MER_Reply message is a source of the data packet received by the router node, the latter re-routes said packets through the network, and if said host node is a destination of said packets (i.e. when the router node receives from said host node a adherence request to a multicast group, the router node sets up with the network a multicast branch which will forward the multicast packets to said host node.

On the other hand, if no host node of the second association table is concerned by the MER_Reply reply message transmitted by the root node, said router node ignores the message received from the root node.

In any case, the router node removes the entry corresponding to the MER_Reply message from the second association table when the lifetime of its status relative to a host node expires.

The method according to the invention further includes a step of managing said first association table wherein, on the root node side, upon receipt by this root node of the MER_Request message, said root node checks whether the message received corresponds to an entry stored beforehand in the first association table and, if the message comes from a router node different from that which is registered for said entry, the root node sends to said router node a MER_Reply message including the same information as that mentioned in the MER_Request message with a NON_MER status for this router relative to the host node mentioned in the message received, and the remaining lifetime of said entry.

According to another characteristic of the method of the invention, for managing said first association table, if the MER_Request message received by the root node corresponds to no entry stored beforehand in the first association table, said root node adds a new entry in said first association table including, besides the information contained in the MER_Request message, a non-zero lifetime for the entry added, and a MER status for the router node relative to the host node mentioned in the message received, as well as the address of said MER router node.

The method according to the invention is implemented by a device for selecting a router node in a LLN (Low power and Lossy Network)-type telecommunication network, for example, including a plurality of router nodes likely to act as data packet routers from or to at least one host node belonging to a multicast group likely to transmit and/or receive data packets through said network, a root node including a first table for storing associations between at least one router node and at least one host node of the multicast group.

According to the invention, each router node of this device is able to transmit to the root node a MER_Request (Multicast Edge Router Request) request of configuration as a router node, and the root node of this device is able to determine, from said first association table, a configuration of the router node and transmit to said router node a MER_Reply reply message including the determined configuration.

BRIEF DESCRIPTION OF THE DRAWINGS

Further characteristics and advantages of the invention will become more apparent from the description that follows, taken by way of non-limiting example, in reference to the appended figures wherein.

DETAILED DISCLOSURE OF PARTICULAR EMBODIMENTS

Figure 1:
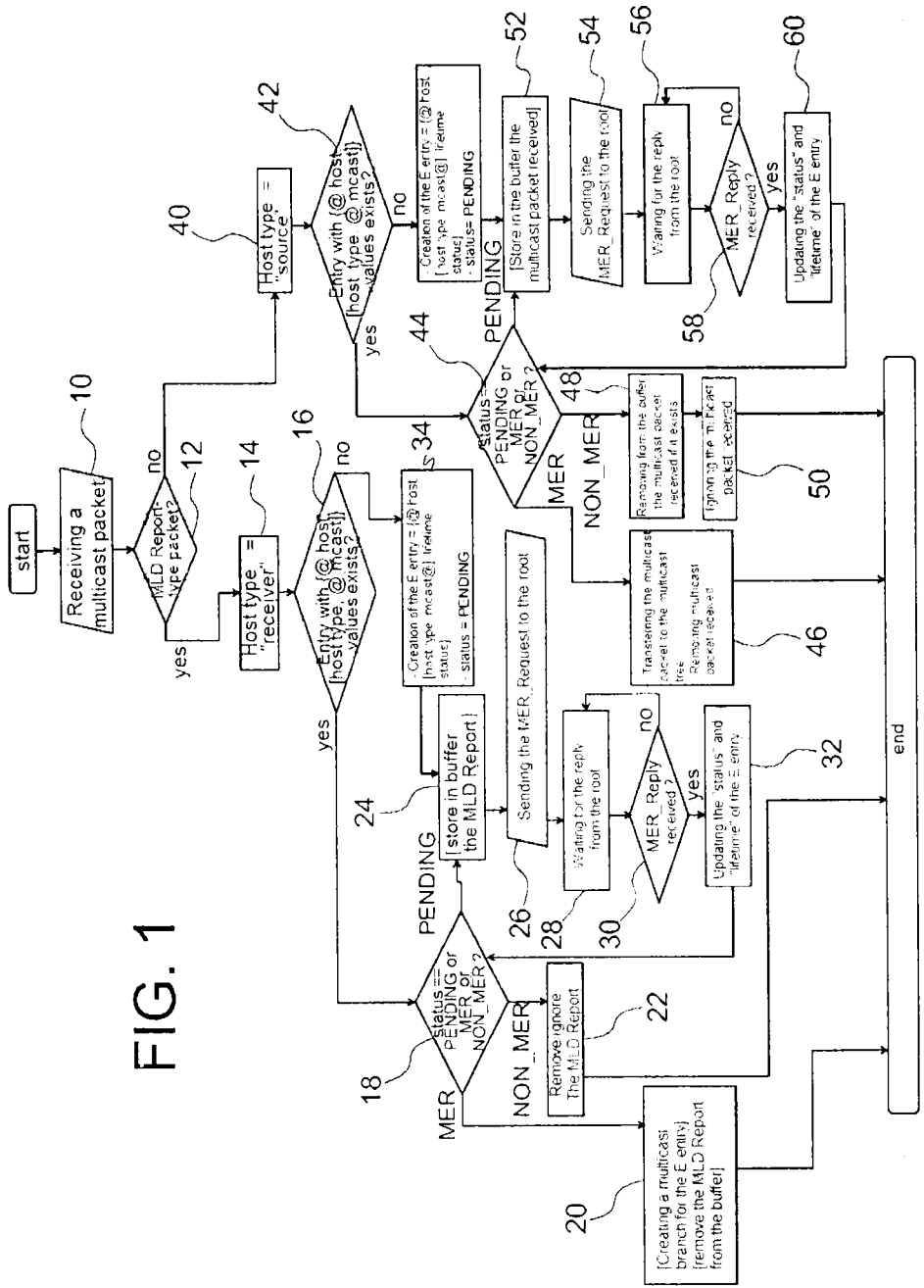
FIG. 1 schematically illustrates the steps of the method according to the invention performed at a router node in a LLN network to configure this router node.

The invention will be described when applied in a LLN (Low power and Lossy Network) network including a plurality of RPL (Routing Protocol for LLN) nodes (2, 3) and a root node 4 with an overview on these RPL nodes. The root node 4 includes a first table, called an association table, for storing associations between each RPL node and at least one host node (6, 8) of a multicast group. The host node may be either the source or the destination of the data packets exchanged through the network.

In the rest of the description, identical references will designate elements having identical functions in the different figures. A source host node 6 of data packets will be referred to as the "source", and a destination host node 8 of data packets as the "receiver".

For the sake of clarity, the LLN network referred to in the rest of the description only includes two nodes within direct range of the host nodes (6, 8). However, the method according to the invention is also applicable in the case where the network includes more than two RPL nodes.

The configuration of a RPL node (2, 3) is made by exchange of MER_Request/MER_Reply configuration messages between the root node 4 and each RPL node that has requested to act as a multicast RPL router for said host node (6, 8).

The RPL node elected is called a multicast edge router (MER) for a source or a receiver.

In the case where the host node is a source, the MER will be in charge of intercepting multicast packets of the source and transmitting them in the RPL multicast broadcast tree.

In the case where the host node is a receiver, the MER will be in charge of intercepting the multicast adherence requests of this receiver, such as for example a MLD Report-type request (for Multicast Listener Discovery described in [R. Vida et al. "Multicast Listener Discovery Version 2 (MLDv2) for IPv6", RFC 3610, June 2004]) and triggering the creation of a multicast routing branch in the RPL network for this group.

In a particular embodiment of the invention, the exchange of MER_Request/MER_Reply messages is implemented through an extension of the DAO/DAO_ACK exchange of the RPL protocol. The DAO (Destination Advertisement Object) message of the RPL protocol is conventionally used by RPL nodes to add or remove a branch (an IP path) of the RPL network. The DAO_ACK message is sent from the root node 4 to the RPL node 8 in response to a DAO message.

It is noted that each RPL node is configured to store a status which can have one of the three possible values:
  MER: the RPL node is a MER router for a given source or destination;
  NON_MER: the RPL node is not a MER router for a given source or destination;
  PENDING: the RPL node has sent a MER status request to the root node 4 (MER_Request) and is waiting for a reply (MER_Reply) of the root node 4.

The status of a RPL node 2, 3 relative to a host node is registered in an entry of a second association table which will further contain the following fields:
  Address of the host: IP address of a multicast source or receiver;
  Type of the host: optional field specifying the type of the host, where the type can be "source" or "receiver";
  Multicast Address: optional field specifying the address of the multicast group associated with the source or receiver;
  Lifetime: lifetime of the entry associated with the host;
  Status: PENDING, MER or NON_MER.

FIG. 1 illustrates the steps of the procedure of selecting a MER performed at a RPL node (2, 3) within direct radio range of a source 6 or a receiver 8 in the LLN network receiving a multicast data packet transmitted by the source 6 or a adherence request to a multicast group from the receiver 8. In the example described hereinafter, the optional [type of the host] and [multicast address] fields are used.

In step 10, the RPL node (2, 3) receives the multicast packet including useful data or a adherence request to a multicast group (e.g. via a MLD message). In step 12, the RPL node (2, 3) checks whether the packet received is a adherence request to a multicast group (e.g. a MLD Report (Multicast Listener Discovery)-type message or not).

In the case where the packet received is a adherence request to a MLD Report-type multicast group for example, in step 14, the RPL node (2, 3) builds a triplet {Address of the host, Type of the host, Multicast Address} comprising the address of the host node (6) indicated in the packet received (i.e. the address of the source host node of the packet), by assigning the value "receiver" to the "Type of the host" field and by assigning the multicast address contained in the adherence request to the "Multicast Address" field. In step 16, the RPL node (2, 3) checks whether an entry with the same Address of the host, Type of the host, and Multicast Address values as those derived from the packet received already exists in the second association table.

If yes, step 18 consists in determining from the second association table the status of the RPL node relative to the host node identified in the message (MLD adherence request) received.

If the RPL node (2, 3) has a MER status, step 20 consists in creating a multicast routing branch towards said RPL node (2, 3) for the entry found (i.e. for the corresponding multicast address) if such a branch does not already exist and in removing the adherence message to the multicast group (e.g. MLD Report) received from the memory of the RPL node (2, 3).

If the RPL node (2, 3) has a NON_MER status, the adherence message to the multicast group (e.g. MLD Report) is ignored, and then removed (step 22) from the memory of the RPL node (2, 3).

If the RPL node has a PENDING status, step 24 consists in storing the adherence message to the multicast group (e.g. MLD Report) received in the memory of the RPL node (2, 3).

In step 26, the RPL node (2, 3) transmits a MER_Request message to the root node 4, and waits for the MER_Reply reply (steps 28-30).

After receiving the MER_Reply message from the root node 4, the status of the RPL node (2, 3) and the lifetime of this status are updated in step 32.

If no entry with the same Address of the host, Type of the host and Multicast Address values as those derived from the packed received exists in the association table, in step 34, an entry is created with the Address of the host, Type of the host and Multicast Address derived from the packet received, a PENDING status for the RPL node (2, 3) relative to the host and a lifetime of this status.

The method continues with steps 24 to 32.

In the case where the multicast packet received is not a adherence request to a multicast group (for example the packet is not a MLD Report-type message) but is a multicast data packet, in step 40, the RPL node builds a triplet {Address of the host, Type of the host, Multicast Address} comprising the address of the host node (8) indicated in the packet received (i.e. the source address of the packet), by assigning the "source" value to the "type of the host" field and by assigning the multicast address indicated in the packet (i.e. the destination multicast address of the packet) to the "Multicast Address" field. In step 42, the RPL node (2, 3) checks whether an entry with the same Address of the host, Type of the host and Multicast Address values as those derived from the packet received already exists in the association table.

If yes, step 44 consists in determining the status of the RPL node relative to the host node identified in the message received from the second association table.

If the RPL node has a MER status, step 46 consists in transferring the packet received to the multicast tree and removing the multicast packet received from the memory of the RPL node if it is therein.

If the RPL node has a NON_MER status, the multicast packet is removed (step 48) from the memory of the RPL node if it is therein.

If the RPL node has a PENDING status, step 52 consists in storing the multicast packet received in the memory of the RPL node. In step 54, the RPL node (2, 3) transmits a MER_Request message to the root node 4, and waits for the MER_Reply reply (steps 56-58).

After receiving a MER_Reply message from the root node 4, the status of the RPL node (2, 3) is updated in step 60.

Figure 2:
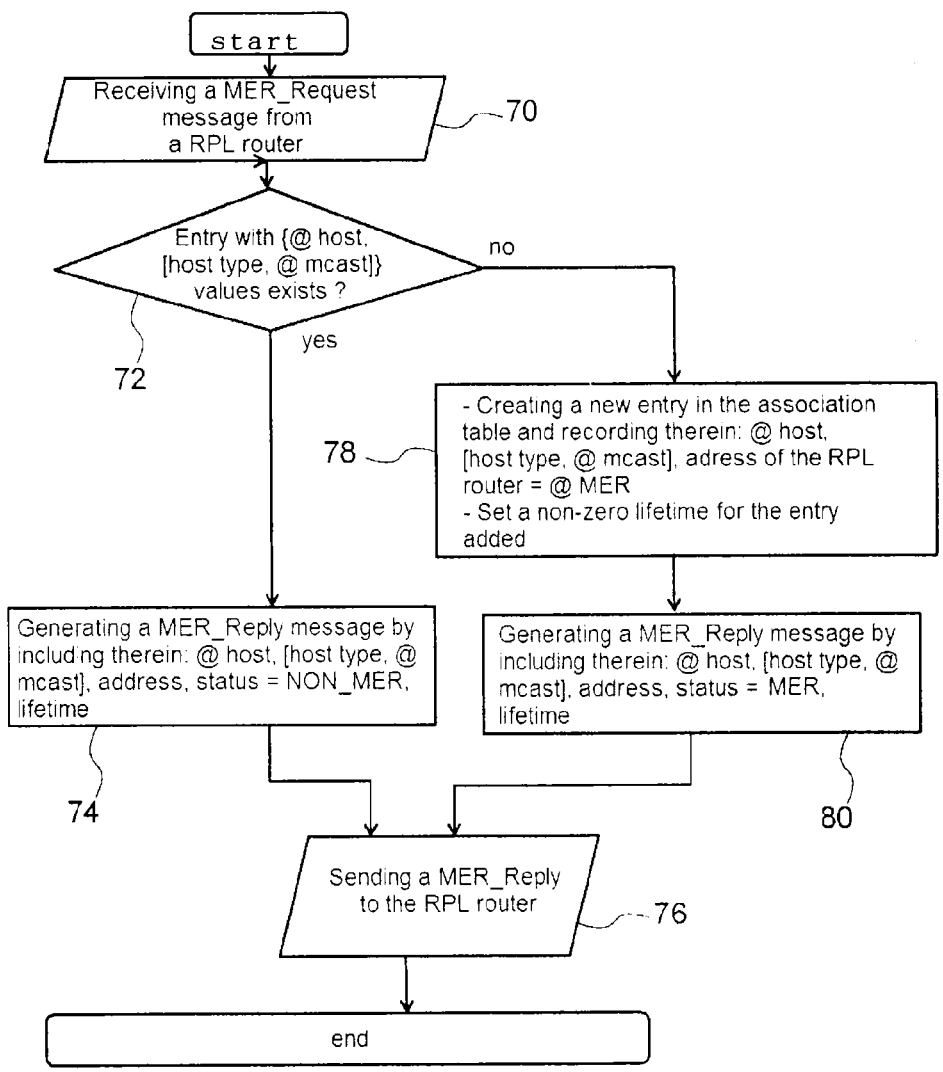
FIG. 2 schematically illustrates the steps of the method according to the invention performed at the root node of a LLN network to configure a router node in this network.

FIG. 2 illustrates the steps of the procedure for selecting a MER performed at the root node 4 following the reception of a MER_Request message from a RPL node (2, 3).

In step 70, the root node 4 receives a MER_Request message from a RPL node (2, 3).

In step 72, the root node 4 looks at the first association table to check whether an entry for the same MER_Request message already exists in this table. The check is based on the comparison of the fields (address of the host, type of the host, multicast address) of the first association table with those mentioned in the MER_Request message received. If an entry already exists in the first table, the root node 4 generates (step 74) a MER_Reply message by including therein the address of the host, @host, the type of the host "host_type", the multicast address "mcast@" and a lifetime equal to the remaining lifetime of the entry found. The root node 4 also includes in the MER_Reply message a status which is a function of the address of the initiator of the MER_Request message and the address of the MER router indicated in the entry found. If the initiator of the MER_Request message is not the one recorded in the entry found, the root node 4 indicates a status field set to NON-MER in the in the MER_Reply message. If the initiator of the MER_Request message is the same as the one recorded in the entry found, the root node 4 indicates a status field set to MER in the MER_Reply message. In step 76, the MER_Reply message is then sent to the RPL node (2, 3).

If the MER_Request message received by the root node 4 is new, that is if the fields of said message have not yet been recorded in the first association table, the root node 4 adds a new entry (step 78) in said first association table comprising the values indicated for the fields of the MER_Request message, that is the address of the host and optionally the type of the host and the multicast address. The root node 4 also sets the lifetime of the entry added to a non-zero value and indicates in this entry the address of the RPL router (2, 3) that has sent the MER_Request message as being the address of the multicast router selected by the root node 4 (that is the Multicast Edge Router/MER) for said host node (6, 8).

In step 80, the root node 4 then generates a MER_Reply message (for example a DAO ACK message if the RPL node has sent a MER_Request as a DAO message) and sends this message to the source RPL node of the MER_Request (step 76). The MER_Reply message contains the same information as that mentioned in the MER_Request message received with, in addition, a status field set to MER and a lifetime status equal to the remaining lifetime of the entry created.

Besides, if a lifetime of an entry in the association table comes to expiration, the root node 4 removes the entry concerned from the first association table.

Figure 3:
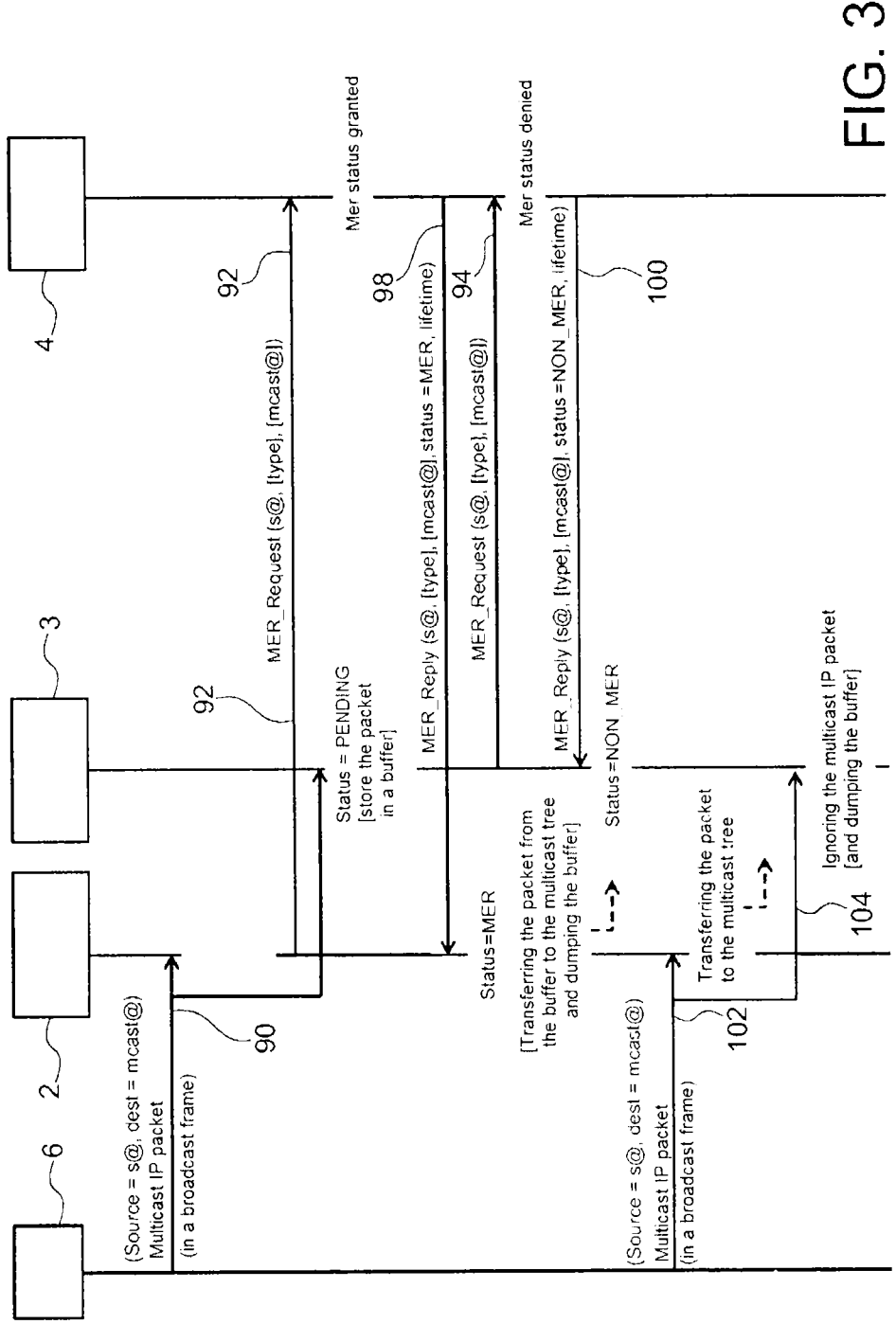
FIG. 3 illustrates the sequence of message exchange between RPL nodes, source host nodes of data packets, and the root node for selecting a router in a RPL network according to the invention.

FIG. 3 illustrates the sequence of message exchange between two RPL nodes, 2 and 3, and the root node 4 to configure a RPL node for the source 6.

In step 90, the source 6 broadcasts a multicast data packets including, besides the useful data, a header indicating the address of the source @S and the multicast address mcast@ of the group to which the destination node(s) of the data packet belong(s).

Upon receipt of the packet broadcast, each of the RPL nodes 2 and 3 records in its second association table an entry containing the address of the source 6 (@S) and optionally the type of the host ("source") and the address of the multicast group (mcast@) if such an entry does not already exist, and sets its status to PENDING as well as a non-zero lifetime of this entry in said table.

Each of the RPL nodes 2, 3 then generates a MER_Request message, for example a DAO message, including a field dedicated to the address of the source @S, an optional field dedicated to the type of the host [type of the host=source] and a last optional field dedicated to the multicast address of the group mcast@ and sends (steps 92 and 94) the MER_Request message to the root node 4.

In this case, each RPL node 2, 3 can, if its available memory allows its, store the multicast packet received from the source 6 while waiting for the MER_Reply reply from the root node 4.

In step 98, the root node 4 sends to the RPL node 2 a MER_Reply message including the same information as that mentioned in the MER_Request message received from the RPL node 2 with, in addition, a status field set to MER and a lifetime field indicating the lifetime of this RPL node 2 in this status.

Upon receipt of the MER_Reply message, the RPL node 2 sets its status to MER in its second association table, transfers the data packet to the multicast tree, and dumps its memory.

In parallel, in step 100, the root node 4 sends to the RPL node 3 a MER_Reply message including the same information as that mentioned in the MER_Request message received from this RPL node 3 with in addition a status field set to NON_MER and a lifetime field indicating the lifetime of this RPL3 node in this status.

Upon receipt of the MER_Reply message, the RPL node 3 sets its status to NON_MER in its second association table.

When the RPL node 2 subsequently receives a new multicast packet from the source 4 (step 102), it reroutes (step 102) automatically the data packet received to the multicast tree.

And when the RPL node 3 subsequently receives a new packet from the source 4 (step 104), it ignores this packet and dumps its memory.

Figure 4:
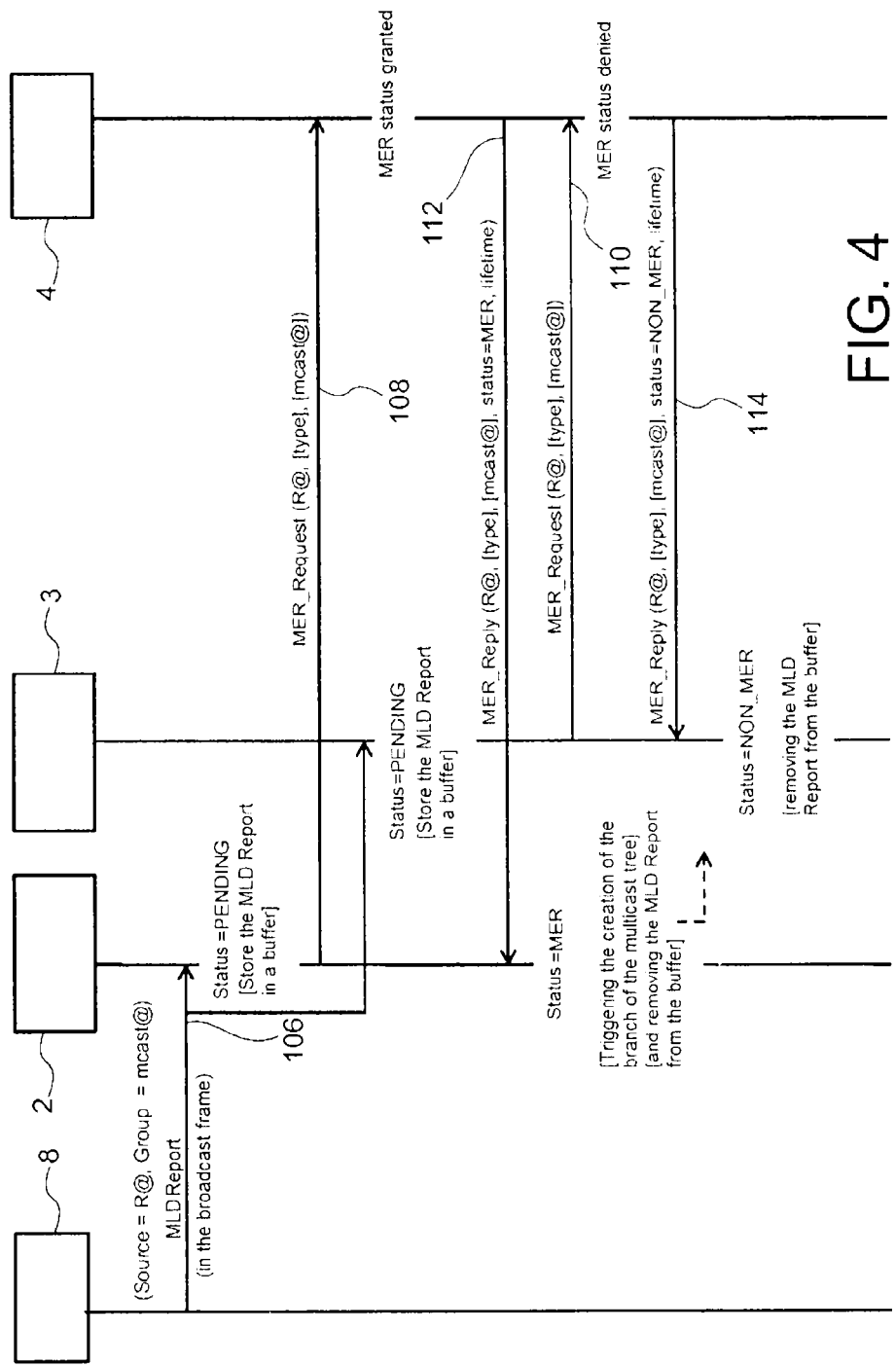
FIG. 4 illustrates the sequence of message exchange between RPL nodes, destination host nodes of data packets, and the root node for selecting a router in a RPL network according to the invention.

FIG. 4 illustrates the sequence of message exchange between the two RPL nodes 2 and 3, and the root node 4 for selecting a router RPL node for the receiver 8.

In step 106, the receiver 8 broadcasts a adherence request to a multicast group (e.g. a MLD Report (Multicast Listener Discovery) type message) including a header indicating the address of the receiver @R (i.e. the source address of the adherence request) and the multicast address mcast@ of the group said receiver 8 wishes to join.

Upon receipt of the adherence request to the multicast group, each of the RPL nodes 2 and 3 records in its second association table the address of the host 8 and optionally the type of the host (receiver) as well as the multicast address that the host wishes to reach, sets the status field to PENDING in said second association table and configures the lifetime field to a non-zero lifetime. Each RPL node 2, 3 stores the adherence request (e.g. the MLD Report message) received if its available memory allows it.

Each of the RPL nodes 2, 3 then generates a MER_Request message (for example a DAO message) containing a field dedicated to the address of the host, an optional field dedicated to the type of the host (type of the host=receiver) and a last optional field dedicated to the multicast address mcast@ of the group, and sends (steps 108 and 110) the MER_Request message to the root node 4.

In step 112, the root node 4 sends to the RPL node 2 a MER_Reply message including the same information as that mentioned in the MER_Request message received from this RPL node 2 with in addition a status field set to MER and a lifetime field indicating the lifetime of this status for the RPL node 2.

Upon receipt of the MER_Reply message, the RPL node 2 sets its status to MER in its second association table, triggers the creation of the branch of the multicast tree, and removes the MLD message from its memory.

In parallel, in step 114, the root node 4 sends to the RPL node 3 a MER_Reply message including the same information as that mentioned in the MER_Request message received from this RPL node 3 with in addition a status field set to NON_MER and a lifetime field indicating the lifetime of this status for the RPL3 node.

Upon receiving the MER_Reply message, the RPL node 3 sets its status to NON_MER in its second association table and removes the MLD message from its memory.

The method according to the invention is applicable both in the context of low resources computer/telecom networks (Low power and Lossy Networks: LLNS), for example the wireless sensor networks, as well as in the multicast IP telecommunication networks thanks to:

- the definition of a mechanism of message exchange in the network (e.g. in a RPL network) between a set of multicast routers and a root node; the exchange allowing the root node to designate a multicast router to serve a multicast source or a multicast receiver (i.e. accept/transfer a multicast packet from a multicast source or send a multicast packet to a multicast receiver);
- the definition of a first association table in the root node and a second association table in each router node (for example RPL router) which associate a selected multicast router (MER) with one or more multicast groups as well as one or more sources and/or receivers, and
- the definition of management functionalities of said association tables (addition/removal of entries in the association table) at the root node and the router nodes.
- the definition of functionalities specifying the conditions for selecting a multicast router (MER) at the root node;
- the definition of functionalities specifying the conditions for selecting a multicast router (MER) at the multicast routers.

It is worthy of note that the present invention is applicable regardless of the routing mode of the multicast traffic used in the RPL network; whether it is in particular the so-called "multicast storing mode" such as defined in RPL specification or even the so-called "multicast non-storing" mode defined in [C. Janneteau, M. Kellil, BD12830, "Procédé de routage d'un flux en mode non-stockage", French patent application filed Jul. 11, 2011 under n° 11 56273].

The invention claimed is:

1. A method for associating a host node to a router node in a LLN (Low power and Lossy Networks)-type telecommunication network including a plurality of router nodes configured to act as data packet routers for the host node which belongs to a group of multicast nodes configured to transmit and/or receive data packets through the LLN-type telecommunication network, and a root node including a first association table for storing associations between the router node, which is among the plurality of router nodes, and the host node, the method comprising:

upon receipt by the router node of a multicast data packet from the host node or an adherence request to a multicast group with which the host is associated from the host node, the router node transmits to the root node a MER_Request (Multicast Edge Router Request) request of configuration as a multicast router node to serve the host node; and, upon receipt of the MER_Request request, the root node determines, from the first association table a configuration of the router node; and, transmits to the router node a MER_Reply reply message including the determined configuration, the determined configuration of the router node including assigning to the router node one of the following statuses:

MER (Multicast Edge Router): indicating that the router node is configured as a single multicast router for the host node, and NON_MER: indicating that the router node is not configured as a multicast router for the host node.

2. The method according to claim 1, wherein the MER_Request request includes an address of the host node, and the MER_Reply reply message includes an address of the host node, and a duration of the configuration determined for the router node relative to the host node, and optionally, an address of the multicast group with which the host node is associated.

3. The method according to claim 1, further comprising configuring, in the router node, a second association table including the following information:

an address of the host node of the multicast data packet or the adherence request to a multicast group received by the router node;

a status of the router node relative to the host node among one of statuses PENDING, MER, or NON_MER;

a lifetime of the status of the router node relative to the host node.

4. The method according to claim 3, wherein the second association table further includes a type of the host node indicating whether the host node is a source or a destination of data packets received by the router node.

5. The method according to claim 4, wherein, when the host node is a source of the data packets received by the router node having a MER status relative to the host node, the router node intercepts all multicast packets transmitted by the host node and re-routes the intercepted multicast packets into the LLN-type telecommunication network, and when the host node is a destination of the data packets received by the router node, the router node intercepts an adherence request to a multicast group transmitted by the host node and triggers creation of a multicast routing branch in the LLN-type telecommunication network for a multicast group.

6. The method according to claim 3, wherein the second association table further includes an address of a multicast group with which the host node is associated.

7. The method according to claim 3, further comprising managing the second association table wherein, upon receipt by the router node of a data packet including an address of a new source host node, the router node:

records in the second association table the address of the new source host node, a PENDING value for the status of the router node relative to the new source host node, and a non-zero value for the lifetime of the status of the router node relative to the new source host node, generates a MER_Request message including an address of the new source host node, and optionally an address of a multicast group with which the new source host node is associated, transmits the MER_Request message generated to the root node.

8. The method according to claim 7, wherein the router node stores the data packet received or the adherence request received while waiting for a MER_Reply reply from the root node.

9. The method according to claim 8, wherein, upon receipt by the router node of a MER_Reply reply message including a NON_MER status, the router node:
- checks whether there is, in the second association table, a host node concerned by the MER_Reply reply message received;
- if yes, sets its status relative to the host node concerned by the MER_Reply reply message received, and
- replaces a value of a lifetime of its status relative to the host node concerned by the MER_Reply reply message received.

10. The method according to claim 9, wherein, if the host node concerned by the MER_Reply reply message received is a source of the data packet received by the router node, the router node removes from its memory data packets stored beforehand during a waiting phase of the MER_Reply reply, and if the host node concerned by the MER_Reply reply message received is a destination of the data packet received by the router node, the router node removes the adherence request to the multicast group received from a destination node stored beforehand.

11. The method according to claim 9, wherein the router node removes from the second association table its status relative to a host node when lifetime of this status expires.

12. The method according to claim 8, wherein, upon receipt by the router node of a MER_Reply reply message including a MER status, the router node:
- checks whether there is, in the second association table, a host node concerned by the MER_Reply reply message received,
- if yes, the router node sets its status relative to the host node concerned by the MER_Reply reply message received, and
- replaces a lifetime of its status relative to the host node concerned by the MER_Reply reply message received.

13. The method according to claim 12, wherein, if the host node concerned by the MER_Reply reply message received is a source of the data packet received by the router node, the router node re-routes the data packets through the LLN-type telecommunication network, and if the host node concerned by the MER_Reply reply message received is a destination of the data packets, the router node sets up a multicast branch in the LLN-type telecommunication network going to the host node concerned by the MER_Reply reply message received.

14. The method according to claim 8, wherein, if no host node of the second association table is concerned by the MER_Reply reply message transmitted by the root node, the router node ignores the MER_Reply reply message received from the root node.

15. The method according to claim 7, further comprising managing the first association table wherein, upon receipt by the root node of a second MER_Request message, the root node checks whether the second MER_Request message received corresponds to an entry stored beforehand in the first association table and, if the second MER_Request message comes from a second router node different from that which is registered for the entry, the root node sends to the second router node a MER_Reply message including same information as that in the second MER_Request message received with a NON_MER status for the second router relative to the host node, and a remaining lifetime of the NON_MER status for the second router.

16. The method according to claim 7, further comprising managing the first association table wherein, upon receipt by the root node of the MER_Request message, the root node checks whether the MER_Request message received corresponds to an entry stored beforehand in the first association table, and if no entry in the first association table corresponds to information in the MER_Request message received by the root node, the root node adds a new entry in the first association table including, besides the information in the MER_Request message received, a non-zero lifetime for the entry added, and a MER status of the router node relative to the host node, wherein the host node is mentioned in the MER_Request message that is received.

17. The method according to claim 3, further comprising managing the second association table wherein, upon receipt by the router node of an adherence request to a multicast group transmitted by a new host node, the router node:
- records in the second association table an address of a new destination host node, a PENDING value for the status of the router node relative to the new destination host node and a non-zero value for a lifetime of the status of the router node relative to the new destination host node,
- generates a MER_Request message including the address of the new destination host node and optionally an address of a multicast group to which the new destination host node intends to register,
- transmits the MER_Request message generated to the root node.

18. A system in a LLN (Low power and Lossy Networks)-type telecommunication network, the system comprising:
- a plurality of router nodes configured to act as data packet routers for a host node belonging to a multicast group configured to transmit and/or receive data packets through the LLN-type telecommunication network;
- a root node including a first association table for storing associations between a router node from the plurality of router nodes and the host node of the multicast group;

wherein:
- the router node is configured to transmit to the root node a MER_Request (Multicast Edge Router Request) request of configuration as a multicast router node; and
- the root node is configured to determine from the first association table a configuration of the router node, and transmit to the router node a MER_Reply reply message including the determined configuration, the determined configuration of the router node including assigning to the router node one of the following statuses:
  - MER (Multicast Edge Router): indicating that the router node is configured as a single multicast router for the host node, and
  - NON_MER: indicating that the router node is not configured as a multicast router for the host node.

19. A non-transitory computer readable medium including a computer program including instructions for carrying out the method according to claim 1, when run on a computer.

* * * * *